July 29, 1930.  M. STEVENSON ET AL  1,771,866
AUTOMOBILE CONTROL SYSTEM
Filed March 2, 1926   2 Sheets-Sheet 1
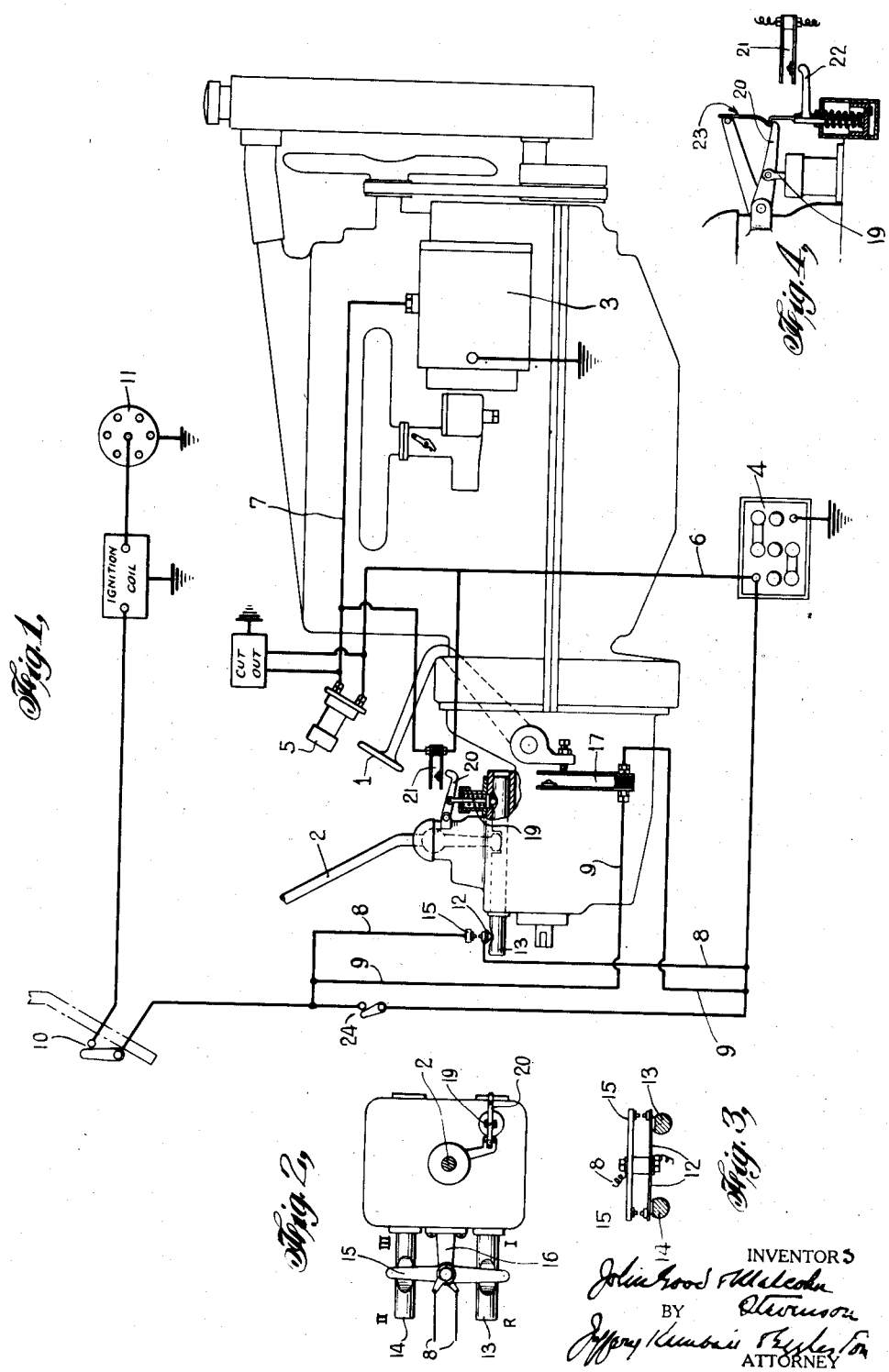

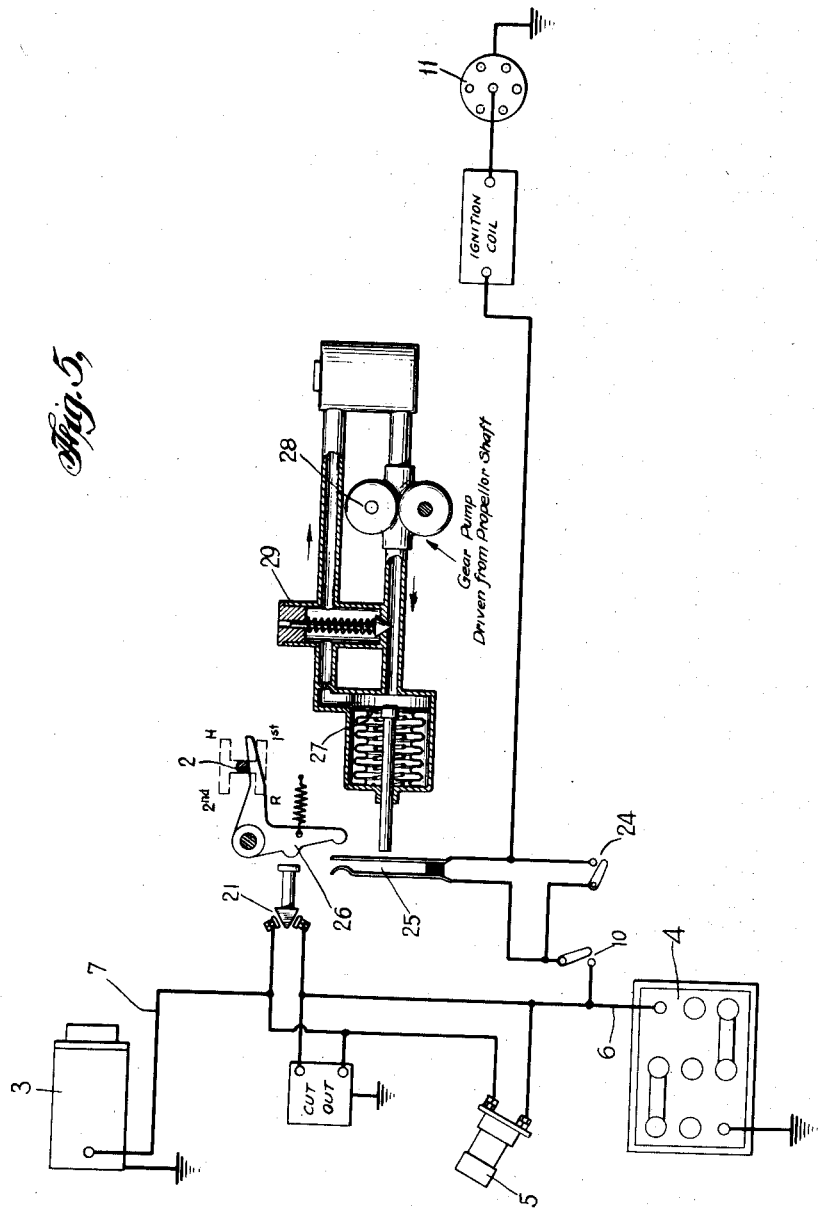

Patented July 29, 1930

1,771,866

UNITED STATES PATENT OFFICE

MALCOLM STEVENSON, OF WESTBURY, AND JOHN GOOD, OF GARDEN CITY, NEW YORK, ASSIGNORS TO AUTOMATIC MOTOR STOP AND START, INC., OF NEW YORK, N. Y., A CORPORATION OF NEW YORK

AUTOMOBILE CONTROL SYSTEM

Application filed March 2, 1926. Serial No. 91,837.

The invention is a control system adapted for saving expense of operation and maintenance of automobiles propelled by internal combustion engines, and consists in the combination with the automobile of means whereby the operation of its engine is automatically suspended during the periods when it is not required for propelling the car or necessary for some other purpose, the control being automatic in the sense that it is mainly or wholly involuntary on the part of the driver and accomplished as a part of, or a natural incident to, the normal use of the car and quite as though such additional means were not present. When a car equipped with this invention is brought to a stop in the normal way, as when necessary to wait for a traffic signal or the like, the engine also stops instead of being allowed to run idle as heretofore and when the driver undertakes or goes through the customary motion or motions for again putting the car in motion the operation of the engine is immediately resumed and is thereupon ready for again propelling the car.

This automatic stopping and starting of the engine so that it is not running when the car has come to a stop and while it remains stopped, affords various advantages in addition to the obvious saving of fuel, which of itself is a considerable item in city traffic. It reduces contamination by gasoline of the lubricating oil in the engine crank case, and it saves the battery which, in most makes of cars, furnishes the ignition current and is therefore discharging during the idling periods The automatic restarting of the engine, according to this invention, requires only a momentary use of battery current, the engine being warm, and takes less current in the aggregate than is taken from the battery for ignition during the idling periods. Moreover, no engine wear occurs during the stopped periods; no exhaust gas is discharged into the street, and the occupants of the car are relieved of the vibration and noise of an idling engine when the car is not moving. In consequence of the foregoing a car equipped with this invention is extremely easy on fuel, keeps its battery in a more fully charged condition, is less subject to wear and is generally more satisfactory.

These general objects of the invention are accomplished by the means for automatically stopping and starting the engine above referred to, and such means are susceptible of embodiment in an unusual variety of forms of apparatus. They may be applied to, or controlled by, any of the normal control instruments by which a car is usually controlled or manipulated by the driver, that is to say, by the gear shift lever, the clutch pedal, the brake pedal or the throttle, or by combinations of two or more of these with each other, or of one or more of them with the propeller shaft or some member which has geared relation to the vehicle wheels and is therefore active only when the car is moving. In every case, the engine operation will be automatically suspended or interrupted, while the car is stopped and its operation is not necessary, and without conscious or special effort on the part of the operator. Various methods of combining the normal control instruments of the car to this end have been developed in accordance with this invention and several of them are shown herein, and others may be readily designed in accordance with the principles above stated and hereinafter more fully explained.

In one form of the invention, the operation of the placing of the gear shift lever in its neutral position, this being an act usually and normally done when coming to a stop or preparing for a period of waiting, will suffice to stop the engine, either by opening the ignition circuit or shutting off the fuel supply, and such readjustment of this instrument as is required to be done before the car can be again put in motion, may be employed to cause the closure of the ignition circuit, or opening of the fuel supply, coincidently with the closure of the starting circuit, the latter momentarily in some types of car, thus setting the engine again in operation. In other forms of the invention, one control instrument, such as the clutch pedal or brake pedal, opens the ignition circuit or otherwise stops the engine and another such as the throttle recloses that circuit and also the starting circuit, so as to restart the engine. In non-electrical systems wherein the motor is mechanically started or air-started, the same instruments are adapted to start the engine by releasing the starting spring or by turning on the air valve as the case may be, and as will be understood. In any embodiment of the present invention it is important that the automatic stopping and starting means shall not be operative on certain occasions, as for instance when the engine is warming up. Then it is desirable that the engine can be started in the usual way and allowed to run idle, as with the driver out of the seat, until the engine is warm. Also when changing gears and thus momentarily disconnecting the engine from its propelling relation to the driving wheels, the engine should not be stopped. Also when running under momentum, the engine should preferably be kept running, even though not propelling the car.

In the accompanying drawing we have illustrated the application of our invention in some of the many different forms in which it may be embodied. Fig. 1 represents diagrammatically its application when the gear shift lever is the principal controlling instrument by which the system is made to function and Figs. 2 and 3 are details of Fig. 1.

Fig. 4 is a modification for a two-unit electrical system.

Fig. 5 is another mode of application of the invention.

Referring to Fig. 1 the internal combustion propelling engine, as shown in the drawing, will be understood without description. Its usual clutch pedal is marked 1 and the usual gear-shift or change-speed lever is marked 2; the other propulsion or car control instruments, such as the brake and throttle levers, do not happen to be employed in this particular form of the invention and for this reason are not illustrated in the figure. The clutch pedal will be understood to be arranged, as usual, to open or release the clutch (not shown) when depressed and thus disconnect the engine from propelling relation to the gear set and rear wheels; the gear-shift lever will be understood to be adapted to make the usual gear combinations in the gear set for connecting the engine, through the clutch, in low (first), intermediate (second), high speed (third) and reverse driving relation to the vehicle wheels, all of which is in accordance with standard automobile design and generally well understood.

The engine taken for illustration is started, cranked over, by a motor 3 actuated by current from the storage battery 4 on the closure of the starting circuit by pressure of the starting button 5. When the engine, operating under its own power exceeds a certain critical speed it drives the motor as a generator and thereby energizes the automatic cut-out (so marked) and through the latter delivers charging current to the battery. This also is a standard electrical system used in many makes of cars and is here taken as a matter of illustration only. The customary ammeter and other common appurtenances to such system are omitted from the diagram for sake of simplicity. The starting circuit, closed by the starting button 5 is traced as follows: from the battery 4, wire 6 to the starting button switch 5, thence by wire 7 to the motor generator 3 and thence by ground back to the battery. The charging circuit established by the cut-out will be understood without description; it is through wire 7 and the cut-out to the battery, independent of the starting switch, the latter being normally open.

The current for ignition is taken from the wire 6, supplied either by the battery or the generator 3, according to the engine speed, thence through either or both of the branches 8 or 9 to the manual ignition switch 10, herein called the dash ignition switch since it is commonly located at the driver's station and thence to the usual induction coil, so marked, and distributor 11 which includes the primary breaker, not shown, and thence to ground. There is a switch in each of the branches 8 and 9 of the ignition circuit and since these branches are in multiple relation to each other, and are both in series relation to the dash switch, it is obvious that one at least of them must be closed in order for the engine to receive ignition current; it is obvious also that unless the dash ignition switch is closed no ignition current can reach the engine, whether either of the branch switches in 8 or 9 is closed or not. The dash switch must therefore be closed in order for the engine to operate, and its manual opening will stop the engine at any time as usual in all cars.

The switch in ignition branch 8 is composed, for illustration, of two insulated spring fingers 12, each adapted to be operated by one of the slide rods 13 and 14 of the gear-set and to be thereby pressed into contact with a complementary fixed contact 15. The spring fingers and the fixed contacts may be supported on a bracket 16 fixed to the rear side of the gear box as indicated and the fingers 12 may be associated with cam notches cut in the rods themselves, or extensions of them, so that any movement of either of these rods, out of so-called neutral (gears disconnected) position, will close one of the fingers 12 against its contact 15 thereby closing the branch 8. The operation and general construction will be plain enough in the drawing; whenever the gear shift lever 2 is set in neutral, the branch 8 is open; whenever it is set "in gear", the branch is closed.

The switch in branch 9 of the ignition circuit comprises a pair of spring-yielding blades 17 or like members one of which is arranged to be engaged by a thrust-screw 18 on a crank arm of the clutch pedal, or on the clutch shaft, and pressed against the other thus closing branch 9 whenever the clutch pedal is depressed, that is, whenever the clutch is opened, or released, or, if desired, whenever the pedal is pressed in the direction to release the clutch, a full release not being essential to bring the blade terminals together.

When the engine is running and propelling the car, the gear lever is of course in gear position, closing switch 8 and the clutch pedal is elevated and the switch of branch 9 is therefore open; the ignition circuit is then through branch 8, and the dash switch 10. When the gear lever requires to be shifted to another gear position, the clutch pedal of necessity must first be depressed; this closes branch 9 and thereby maintains the ignition circuit active while the gear lever passes through neutral which is its open circuit position. No interruption of the ignition current thus occurs during the operation of gear-shifting. But when the driver has brought the car to a stop, he ordinarily puts the gear lever in neutral and then takes his foot from the clutch pedal. This opens the switches in both branches 8 and 9 and thus opens the ignition circuit and the engine stops, and this will be seen to occur without any special effort or attention on the part of the driver.

In order to start the engine in this form of the invention, the gear lever, or some part operated by it, is arranged so that the act of placing the car in gear will close the starting circuit. This can be done in many ways; in the case in hand, the gear-set slide rod 13 which is the one which controls the "first speed" and "reverse" gear settings, is formed with a cam notch which registers with a spring-pressed plunger 19 when that particular slide rod 13 is in its neutral position, as shown in Fig. 1. Movement of that rod either to first or reverse position raises the plunger and thereby rocks the crank arm 20 which latter closes the contacts 21 together and thereby establishes the starting circuit. This movement of the slide rod is ordinarily done when the clutch pedal is pressed down and this insures that the ignition circuit will also be closed, so that the engine is accordingly again set in action, but the same movement of the slide rod also closes branch 8 of the ignition circuit, so that the latter circuit is now closed in both its branches 8 and 9, and it remains closed through branch 8 when the driver lets clutch pedal come up to closed position or causing the engine to propel the car. Thus, it will be seen that the re-starting of the engine, as well as the stopping is accomplished, simply by the performance, by the operator, of the normal and customary operation of controlling the propulsion of the car by the engine.

The method of re-starting the engine must of course take into account the type and characteristics of the starting system employed in the particular car. For the single unit system shown, it does no harm for the starting circuit to remain closed while the gear shift lever is in low or reverse speed position. When the gear shift lever is moved to second or high speed position, no closure is produced in the switch contacts 21, since in such movements the slide rod 14, only, is displaced from middle position, and this has no connection to the starting switch 21. It would, however, be practical, if it should be desired, for the slide rod 14 to operate the starting switch 21, in its middle or second speed position. Some drivers often start the car in the second speed position. As above pointed out the use of the battery for starting the engine when the latter is warm from its previous running is extremely small; ordinarily a half or a quarter turn of the crank shaft is sufficient and frequently the engine starts on the retained compression merely by the closure of the ignition circuit. The aggregate battery current consumption in cars equipped with this invention, runs much less than the consumption which would otherwise occur if the engine were allowed to idle during the stopped periods. This is of course variable, according to the use to which the car is put, but the saving is substantial in most cases. In the case of two unit systems, or other systems in which the starting circuit cannot be kept closed indefinitely, the contacts 21 are arranged to open, momentarily after being closed. This can be done by providing the switch 21 with a dash pot connection, as indicated in the detail of Fig. 4, which may be arranged with an arm 22 on its plunger member and with the latter provided with a spring latch 23, to be operated, in one direction only, by the crank arm 20. When the latter rises, it draws the dash pot plunger quickly upwards so that its arm 22 closes the starting contacts 21; continued movement of the crank arm 20 causes it to disengage from the latch, and allows the plunger to return slowly under the influence of the dash pot spring. By appropriate adjustment of the dash pot, the duration of the closure of the starting contacts 21 can obviously be made as long or as short as desired by appropriate regulation provided in the dash pot plunger, but, as already stated, only a very brief closure is required when the engine is warm. When crank arm 20 again resumes its depressed position, it rides over the bevel of the latch and is thereupon ready to repeat the operation of the starting switch. The spring latch is guided by a fixed stop as indicated, to prevent its flexure to the left, but permitting it to yield to the right when the crank arm returns to its depressed position. Obviously this is only one of many switch devices which can be used to accomplish the same result.

For those occasions, when it is desired to keep the engine running with the gear shift lever in neutral position and the clutch pedal elevated, both branches 8 and 9 of the ignition circuit being then open, special means are provided to render the automatic switches in those branches ineffectual to perform their normal engine-stopping functions. A simple means of accomplishing this effect consists in a special shunt or branch of the ignition circuit around the two automatic switches, which shunt can be manually closed by a switch, such as indicated at 24. When such switch is closed, it will be obvious that ignition can be retained and the engine kept running for as long as may be desired.

In the system, as above described, it will be seen that two of the control instruments normally used in controlling the propulsion of the car by the engine, viz., the gear shift lever, and the clutch pedal, are correlated to accomplish the object of the invention. In the diagram of Fig. 5 only one of such instruments, viz., the gear shift lever, is employed. In the system of this diagram the principal parts will be recognized by the reference numerals which are the same as the corresponding parts in the diagram of Fig. 1. The ignition circuit is from wire 6 to the driver's or dash ignition switch 10, and through automatic switch 25 to the coil 11 and distributor to ground. Two means are provided for closing the switch 25, both of which must be inactive in order to deprive the engine of ignition current and thus stop it. One of these means is a bell crank or equivalent mechanism 26 associated with the gear shift lever, so that it is moved to its switch closing position whenever the lever is pushed over to the position for entering first or reverse speeds. The familiar H-shape path of the gear lever is indicated by the dotted lines from which the operation just referred to will be clear. While the lever is in reverse or first speed, and also while it is passing from one to the other, the bell crank is held in its switch-closing position; at all other times it occupies an inactive position by virtue of the springs present in the switch mechanism or by the special spring shown. This same bell crank is also arranged to press against and close the starting switch 21 coincidently with its movement to the position in which it closes switch 25.

The other means for closing automatic switch 25 is a diaphragm or bellows 27, one side of which is exposed to the pressure in the circuit of a small rotary oil pump 28 driven in any appropriate manner from the propeller shaft of the car, or from any other part connecting with the wheels of the car so that the pump will be in operation, exerting pressure on the diaphragm for as long as the car is in motion. The motion of the car is thus available for closing switch 25 or for keeping it closed for such times as the bell crank 26 is not performing that service. In place of the pump and diaphragm, any other suitable means rendered active by the movement of the car, such as fly-balls or the like, could be substituted as the means for keeping switch 25 closed, or for otherwise accomplishing the object of the invention. When the pump is employed a spring-loaded valve 29 is included in the oil circuit, the function of which is to maintain a constant pressure on the diaphragm regardless of the speed of the car and so that the diaphragm will be kept fully distended at the slowest car speeds. When the car stops the oil pressure in the diaphragm chamber is relieved either by leakage back through the pump gears or through a restricted passage provided for the purpose and as indicated. The gear pump can conveniently be mounted on the exterior of the usual gear-set-casing or it can be conveniently built into the gear-set mechanism.

In the operation of the system illustrated in Fig. 5, when the driver brings the car to a stop, the failure of pressure on the diaphragm will cause it to withdraw its plunger or stem from the switch, under the influence of its spring, and if then the gear shift lever is in high or second speed, or if the driver puts it in neutral, the switch 25 will be opened and the engine will stop. It will remain stopped until the driver again moves his lever toward or into first speed or reverse position, the effect of which is to close simultaneously the ignition circuit and switch 21 of the starting circuit. The engine thus started, the driver closes the clutch as usual and the car resumes its motion.

As in Fig. 1 a by-pass branch of the ignition circuit, by-passing the automatic switch 25 is supplied and controlled by a manual switch 24, which can be closed whenever it is desired to render the automatic features of the system ineffectual, as for example, when warming a cold engine, testing the carburetor or the like.

It will be understood that in this form also, the closure of the starting circuit can be made as a momentary closure for accommodation to those electrical systems in which the starting circuit does not remain closed during the action of the engine, that is to say, the bell crank 26 can operate a starting switch such as shown in Fig. 4 or the equivalent, and such lever, or the crank arm 20 can also operate any other kind of starting switch or starting device.

It will of course be understood that the drawings herein are diagrammatic including the illustration of the switches and the switch closing members. The latter are of course designed with reference to their particular service and location and can obviously take a great variety of forms. Furthermore, and so long as their effect is to stop the engine while the car is in use as a vehicle but not in motion, it is not important whether they operate to stop the engine immediately when the car stops or slightly before or after. In some embodiments of the invention as also in some methods of using the systems incorporating the invention, it may be that the car may come to a stop before the engine stops. Thus in Fig. 1, if the driver holds the clutch open after the car stops the engine will continue running until he raises his foot, which is his normal act when a car is compelled to wait; in Fig. 5, he may not put his gear lever in neutral until after the car stops, with of course the same effect. In like manner he may cause the engine to restart some time in advance of starting the car, that is to say, by putting the gear lever into gear position and thereafter delaying the closing of the clutch. In these cases, the operations are the normal operations that are gone through with when stopping the car and again putting it in motion whether they are promptly performed or not. Obviously it is preferable that, in starting the car, the engine be started slightly before power is transmitted to the vehicle wheels so that it will surely be operating on its own power when called upon to do work. This means, in practice, that some control instrument other than the throttle lever be used for causing engine starting and preferably some instrument other than the clutch pedal, though the use of both or either of these controls is, of course, within the invention.

It will be apparent that some of the advantages of this invention can be obtained in systems which are not fully automatic as in forms above described, that is to say, either the engine stopping or its starting is effected by an instrument on the car other than the control instruments normally and necessarily used when stopping the car and putting it in motion, the complementary operation being in any event done automatically. Thus, in such case, the bellows device in Fig. 5 might be substituted by a direct manual means for operating the switch 25, or the bell crank 26 could be operated manually, that is, instead of by means of the gear-shift lever. These departures from full automatic operation have the objection that they impose some slight additional duty on the driver and are obviously less desirable on that account, but by their use it becomes convenient and easy to avoid unnecessary idling of the engine when the car is stationary and to that extent the new advantages of this invention are made available.

We claim:

1. In an automobile, a control system of the kind described, comprising in combination with the gear-shift lever, and the engine ignition and starting circuits, means operated by said lever for controlling both circuits, and means rendered active by the motion of the car, for preventing the opening by said lever of the ignition circuit.

2. In an automobile control system for the purpose described, the combination with an operator's control, of an ignition circuit, two members each operable to control the same, operating connections between one of said members and the operator's control adapted to complete the said circuit upon manipulation of said operator's control during starting, an engine starting motor and a switch therefor arranged for operation coincidently with the operation of said first ignition controlling member and automatic actuating means for the other of said members serving to sustain engine operation independently of the manipulation of said control, said connections and actuating means permitting both said members to operate to stop the engine when the car is brought to a normal position of rest.

3. In an automobile, the combination with the usual gear-shift lever adjustable from neutral to starting and normal running positions, of an ignition circuit, an engine starting motor and a circuit therefor, switch-actuating means responsive to movement of the gear-shift lever from neutral to starting position and arranged to complete both said circuits, and automatic means adapted to sustain engine operation during the manipulation of said lever in normal operation of the automobile, said automatic means including a member arranged to control the ignition circuit independently of said switch-actuating means.

4. In an automobile control system for the purpose described, the combination with an operator's control, of an ignition circuit, a control member therefor arranged to complete said circuit when said control is manipulated during starting and to open said circuit when the control is in a normal position of rest, an engine starting motor and a switch therefor adapted to be closed by the operator's control coincidently with the operation thereof to complete the ignition circuit, and automatic means acting independently of said control to sustain engine operation whenever the vehicle is in motion.

5. In an automobile, a control system of the kind described comprising the combination of an operator's control member, engine ignition and starting circuits, means operated by said member for controlling both said circuits and means rendered active by the motion of the car for preventing the opening by said member of the ignition circuit such means comprising a fluid-pressure device operated by a moving part of the vehicle.

In testimony whereof, we have signed this specification.

MALCOLM STEVENSON.
JOHN GOOD.